(No Model.)

J. P. EDMONDS
SPLIT BOLT WEDGE.

No. 268,207.  Patented Nov. 28, 1882.

WITNESSES:
Donn Twitchell.
C. Sedgwick

INVENTOR:
J. P. Edmonds
BY Munn & Co
ATTORNEYS.

UNITED STATES PATENT OFFICE.

JOHN P. EDMONDS, OF JACKSBOROUGH, TENNESSEE, ASSIGNOR OF ONE-HALF TO HORACE M. CAWOOD, OF SAME PLACE.

SPLIT-BOLT WEDGE.

SPECIFICATION forming part of Letters Patent No. 268,207, dated November 28, 1882.

Application filed June 8, 1882. (No model.)

*To all whom it may concern:*

Be it known that I, JOHN P. EDMONDS, of Jacksborough, in the county of Campbell and State of Tennessee, have invented a new and useful Improvement in Wedge-Bolt Fastenings for Wagon-Thimbles and other Purposes, of which the following is a full, clear, and exact description.

This invention relates to bolts which are partially split lengthwise at one of their ends and have combined with them wedges which, on the bolts being forced home, cause the split portions of the bolts to be expanded for the purpose of holding the bolts in their places.

Reference is to be had to the accompanying drawings, forming part of this specification, in which similar letters of reference indicate corresponding parts in both the figures.

Figure 1:
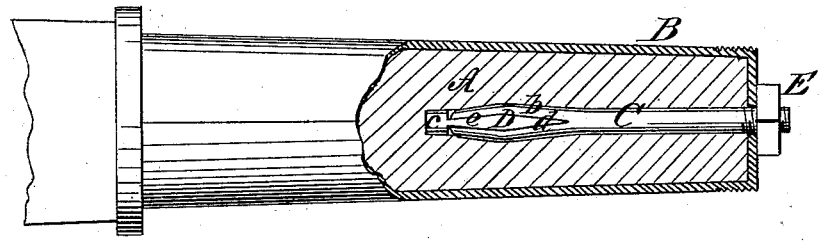
Figure 2:
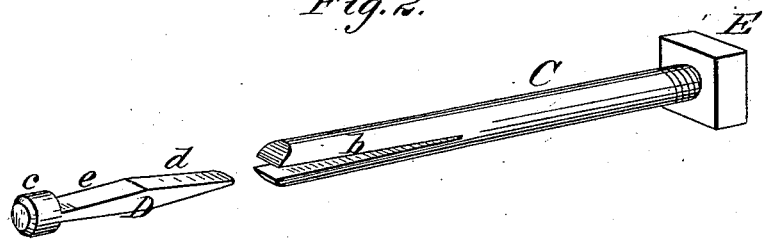

Figure 1 represents a partly sectional longitudinal view of one end of a wagon-axle and thimble thereon with my improved wedge-bolt fastening applied to hold said thimble to its place, and Fig. 2 shows views in perspective of the split bolt with its nut and of the wedge used in connection with the same.

A in the drawings indicates the one end portion of a wagon-axle, and B an ordinary metal thimble arranged thereon.

C is the bolt for holding the thimble to its place, and which is entered centrally in a longitudinal direction within the axle from the outer end of the thimble. The inner end of said bolt has a longitudinal split, *b*, in it for the reception of a wedge, D, as hereinafter described, and the outer end of the bolt has a screw-thread, on which is fitted a nut, E. A suitable hole is made in the axle for the reception of the bolt C and the wedge D. The wedge D is about the same length as the split *b* in the bolt, and has a round head, *c*, of about the same diameter as the bolt. Said wedge, which is inserted head foremost down or back within the bolt-hole in the axle, is flat-pointed and of a double reverse wedge shape throughout the length of its body—that is, it gradually thickens for one half or portion of its length from its forward end backward and then gradually diminishes toward its head, thus forming two reverse wedges, *d e*, the back one, *e*, of which should be of sufficient thickness at its thinnest end to give it a firm hold on the head.

With the parts constructed as described the bolt C is not only expanded laterally at its split portion *b* by the forward portion *d* of the wedge D, as said bolt is forced or driven inward within the hole in the axle prepared to receive it, but the hold of the bolt is greatly augmented by the hug of the free end of the bolt over the intermediate swell of the wedge and bearing of the same on the reversely-tapering or back portion, *e*, of the wedge.

The nut E, it will be observed, is a movable one and not a stationary one or box, as has before been used in connection with single wedge-bolt fastenings, and it serves to adjust the hold of the bolt on the thimble or sleeve of the axle or whatever the device may be which is to be secured by the bolt.

Having thus described my invention, I claim as new and desire to secure by Letters Patent—

A split-bolt wedge having its body flat-pointed at one end and increasing in thickness from each end toward the middle, whereby the greatest spread of the split ends of the bolt will be about the middle of their length, as and for the purpose specified.

J. P. EDMONDS.

Witnesses:
J. HENDERSON REID,
H. M. CAWOOD,
S. C. BAIRD.